United States Patent [19]
Hofmann

[11] Patent Number: 6,016,715
[45] Date of Patent: Jan. 25, 2000

[54] HARMONIC DRIVE

[76] Inventor: Detlev Hofmann, Mühlweg 5, 75249 Kieselbronn, Germany

[21] Appl. No.: 09/225,094

[22] Filed: Jan. 4, 1999

Related U.S. Application Data

[63] Continuation of application No. PCT/EP97/03779, Jul. 15, 1997.

[51] Int. Cl.[7] .................................................. F16H 49/00
[52] U.S. Cl. ................................. 74/110; 74/96; 74/640; 476/36
[58] Field of Search ............................. 74/96, 110, 640; 476/36

[56] References Cited

U.S. PATENT DOCUMENTS

| | | | |
|---|---|---|---|
| 3,468,175 | 9/1969 | Rabek | 74/110 |
| 4,189,961 | 2/1980 | Yamashita et al. | 476/36 |
| 5,042,322 | 8/1991 | Hofmann . | |
| 5,059,159 | 10/1991 | Shaffer | 74/110 |

FOREIGN PATENT DOCUMENTS

| | | | |
|---|---|---|---|
| 348634 | 2/1992 | Germany | 74/640 |
| 1229-484 | 5/1986 | U.S.S.R. | 476/36 |
| WO 84 01418 | 4/1984 | WIPO . | |

*Primary Examiner*—Tamara L. Graysay
*Assistant Examiner*—William C Joyce
*Attorney, Agent, or Firm*—Klaus J. Bach

[57] ABSTRACT

In a harmonic drive arrangement for the displacement of one component relative to another, a ball cage with cavities and balls movably disposed in the cavities is associated with one of the components and a transfer structure with conical recesses is associated with the other of the components adjacent the ball cage. The cavities are arranged in spaced rows and the conical recesses are arranged in rows spaced differently than the cavity rows. A pressure element with ascending and descending cam structures is movably disposed adjacent the ball cage to engage and move the balls into, and permit them to move out of, the recesses as the pressure element is moved along the ball cage to thereby provide for relative movement of the two components.

9 Claims, 6 Drawing Sheets

HARMONIC DRIVE

This is a Continuation-application of international application PCT/EP97/03779 filed Jul. 15, 1997 and claiming the priority of German application 196 29 358.8 filed Jul. 20, 1996.

BACKGROUND OF THE INVENTION

The invention relates to a harmonic drive arrangement for moving two components relative to one another.

Such a harmonic drive arrangement is known for example from U.S. Pat. No. 5,042,322 where it is used as a drive for an indexing apparatus. In this arrangement the harmonic drive must provide for sufficiently small movements to permit the accurate adjustment of angular positions of the two components relative to each other. In such applications, there are high requirements on the repeatability of the relative positions of the components and on the capability of the drive to transmit relatively high forces. Such harmonic drive arrangements may be used also in connection with work stations or in connection with robots. In the known drive arrangement, two toothed rings with different numbers of teeth are coupled by rolling members, that is specifically balls, which are always held in contact with the opposite side walls of the toothed rings.

The rolling elements, that is, the balls are supported by a pressure element or a cam plate so as to move the balls more less deeply into the space between adjacent teeth of the toothed rings such that the desired speed or distance of movement reduction of one component relative to the other is obtained. An extremely precise position adjustment of one component relative to the other is achieved in this way with the known arrangement with a reduction ratio depending on the number of teeth on the toothed rings and the difference in the number of teeth between the two toothed rings. Accurate movement control can be achieved in this manner although only in one, that is, for example, in circular direction but not in another, for example, axial direction of movement. Also, the transmission of forces is limited in as much as the balls provide for force transmitting engagement between only a part of the teeth associated with the two different components

SUMMARY OF THE INVENTION

It is the object of the present invention to provide a harmonic drive arrangement capable of reliably transmitting large forces and not only in one direction of movement.

In a harmonic drive arrangement for the displacement of one component relative to another, a ball cage with cavities and balls movably disposed in the cavities is associated with one of the components and a transfer element with conical recesses is associated with the other of the components adjacent the ball cage. The cavities are arranged in spaced rows and the conical recesses are arranged in rows spaced differently than the cavity rows. A pressure element with ascending and descending cam structures is movably disposed adjacent the ball cage to engage and move tie halls into, and permit them to move out of, the recesses as the pressure element is moved along the ball cage to thereby provide for relative movement of the two components.

Since the engagement surface areas are formed by a plurality of conical recesses, the balls are in Contact with relatively large surface areas so that they are capable of transmitting relatively large forces. In addition, such large forces can be transmitted in two directions, for example, in circular direction for transmitting rotational torque forces and also in axial direction. Accordingly, a position can be reached accurately on a surface of any shape which may be defined by a Cartesion coordinate system, a cylindrical coordinate system or a polar coordinate system.

In order to make it possible with the relatively large transmission ratio to move also over greater distances while still providing for an accurate position determination the conical recesses may be joined to a member with grooves in which the arrangement has only one degree of freedom so that movement along the grooves is easily possible.

For use of the harmonic drive arrangement for example in connection with a chuck or with an indexing device, the cam angles of the cam disc are preferably smaller than the self-locking angle. Then, the harmonic drive can be coupled manually or by a drive mechanism and the coupling will remain locked without a locking mechanism. In this way, a pressure, a tension, an expansion or compression clamp for example, can be released without the need for a spring.

For accommodating greater transmission forces two harmonic transmission structures may be combined integrally as will be described later.

With an arrangement wherein the pressure element is formed integrally with the piston of an operating cylinder and extends around the cylindrical transmission element and further is disposed at the inside of an annular piston which can be subjected to pressure at opposite sides, the drive can become very compact so that it is quite suitable for use in operating mechanisms for actuating articulated structures or for use in manufacturing robots.

The invention will become more readily apparent from the following presentation of various embodiments thereof described below on the basis of the accompanying drawings.

DESCRIPTION OF PREFERRED ELEMENTS

The description of the various embodiments is not intended to limit the application of the inventive concept to a given specific arrangement.

The arrangement for moving or rotating a first component 10 relative to a second component 11 includes a harmonic drive structure 12.

Such an arrangement can be used for example, to provide for rotational or pivotal movements in a work station or on robots wherein the known operating mechanisms are too large and too expensive. However, because of the high reduction capability the arrangement can be used also in connection with a chuck or as a force amplifier for two directions of movement. In any case, the arrangement can be made to be very compact because of the areal nature of the support structure which is particularly advantageous in connection with rotational or pivotal movements The harmonic drive can be used for example as linear motion transmission device which, at the same time, can perform screw-type and/or rotational movements. The drive can also be used for effecting clamping actions in connection with air operating cylinders, for a rapid adjustment control by disengagement or releasing actions, for a stepless linear fine adjustment of machine vises, but also for presses, lifting devices and vernier measuring devices as well as for angular position control devices. The drive is further suitable for use in connection with brake force-, hand lever or air force amplifiers or it may be part of a steering gear, or of combined linear and circular indexing gear structures. Furthermore, the drive may be used for the fine adjustment of cameras or telescopes, for example when the equipment is moved on an uneven surface and must be kept adjusted. In this case, some of the control rings normally used for the adjustment can be omitted.

Figure 1:
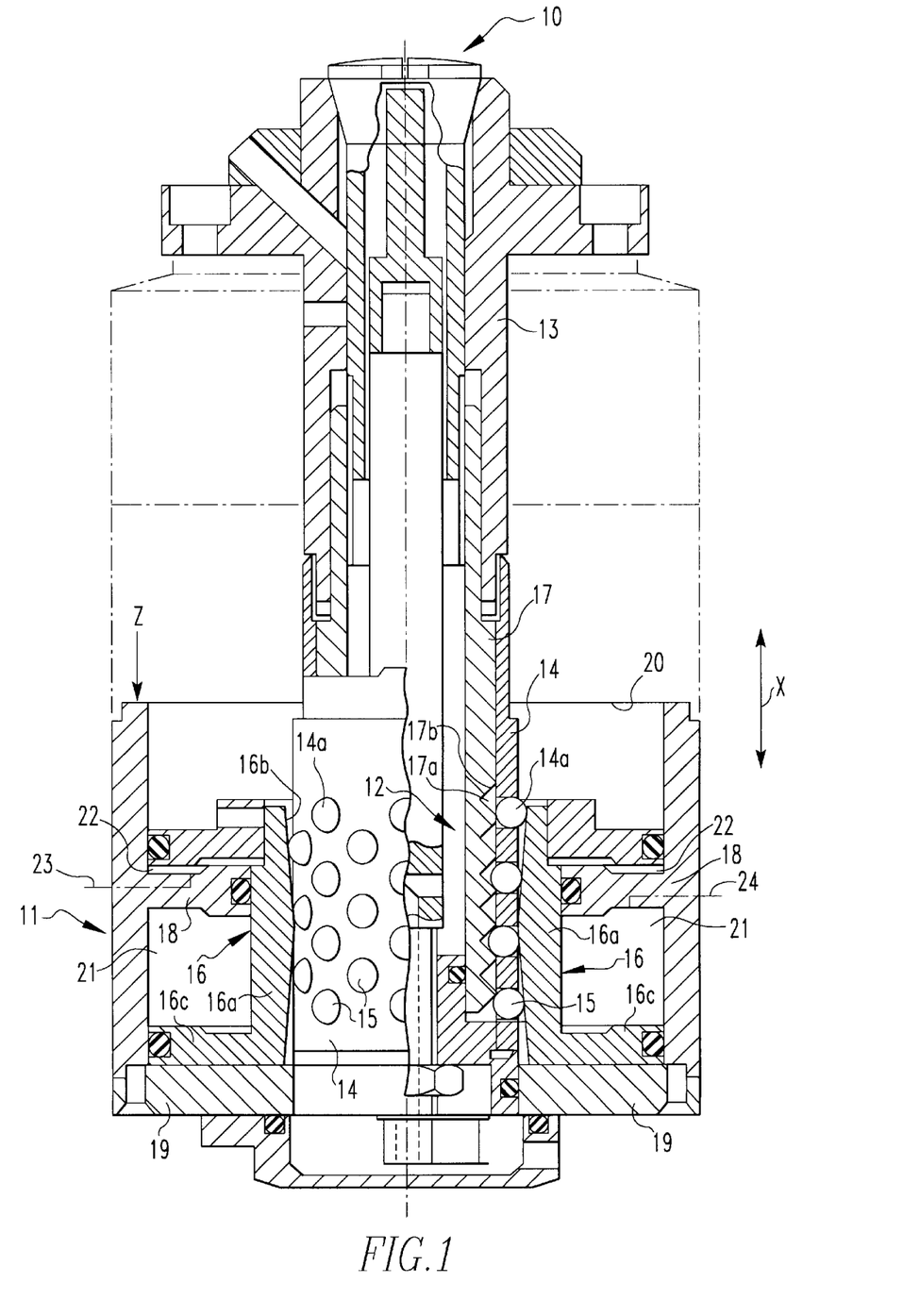
FIG. 1 is an axial cross-sectional view of a harmonic drive arrangement by which two components can be moved relative to each other.

There are also various possibilities for the application of the primary operating force. FIG. 1 shows a hydraulic or pneumatic operating mechanism; however, the primary operating force may be derived from gravity forces, from centrifugal forces, from acceleration or deceleration forces during progressive braking, from jamming forces, from magnetic or from spring forces. It may further be generated by an impact force, by flow or friction forces or it may be generated mechanically or manually or by a motor.

Figure 2:
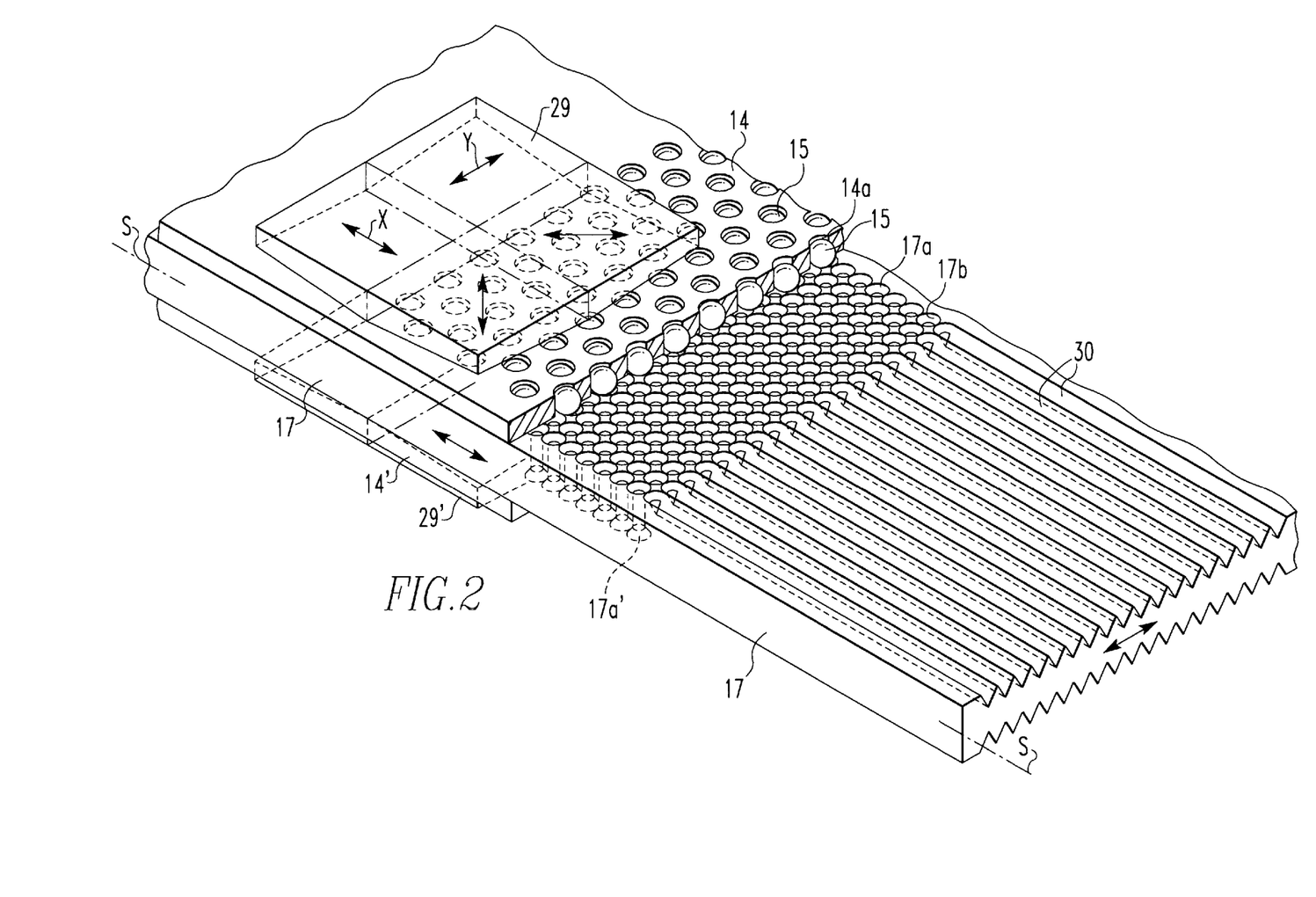
FIGS. 2, 2a, and 2b are perspective views of a harmonic drive arrangement.

FIG. 1 shows a cylindrical arrangement including a guide element 13 which is stationary with respect to the components 10, 11. A ball cage 14 is disposed on the guide element 13 and includes a number of cavities 14a arranged in rows in the rotational or axial direction of movement x and including rolling bodies such as balls 15, which are movably supported in the cavities in a direction transverse to the direction in which the guide element 13 extends or to the direction of movement x or y (FIG. 2, circular in FIG. 1). The balls may be arranged directly adjacent to one another; however, in FIG. 1 they are disposed in recesses and cavities which are arranged in rows and displaced in parallel relationship so as to provide for sufficient guide structure between the cavities for the transmission of large forces.

The arrangement as shown in FIG. 1 permits relative movement of the cylindrical components. Such an arrangement may be used for example in connection with a chuck. A pressure element 16a is associated with one of the components 10, 11 that is, as shown in FIG. 1, with the outer component 11. The pressure element 16a includes inclined ball rolling surfaces or cams 16b by which the balls 15 are engaged and which move the balls 15 into the prism-like cavities 14a of the hall cage 14 and into the recesses 17a to a degree as determined by the cams 16b. In the given example, the other component 10 is disposed within the cage 14 and may for example be a clamping vice. It is connected to a transfer element 17 which has a number of rows of engagement recesses 17a formed in its surface adjacent the ball cage 14. The recesses 17a may be arranged directly adjacent one another or they may be arranged at a uniform distance from each other. The balls 15 are moved by the pressure element 16a into these recesses 17a in such a way that they engage the side surfaces 17b of the recesses 17a. In order to achieve a transmission of motion, the ratio of division of the rows of recesses is slightly different from that of the rows of cavities 14a in the ball cage 14. As shown in FIG. 1, the recesses 17a have a greater spacing than the respective cavities 14a in the ball cage 14. The outer edges of the cavities 14a may be flanged to retain the balls which however, is not shown in the drawings.

If the cylindrical pressure element 16a, which has oppositely directed inner rolling surfaces, is moved upwardly from the position as shown in FIG. 1, the upper balls 15 are pressed further into the recesses 17a of the transmission element 17 so that the transfer element 17 is moved downwardly. When the pressure element 16a is moved upwardly up to the stop 20, the transmission element 17 is moved downwardly if the spacing of the recesses 17a is greater than that of the cavities 14a as it is shown in FIG. 1. The ratio of transmission depends on the division ratio of the rows of recesses and cavities and the inclination angle of the cam structure on the pressure element is so selected that the balls are always held in contact with the surfaces of the recesses in the transfer element. In the embodiment as shown in FIG. 1, the transmission ratio is about 1:10. On the other hand, if the spacing of the rows of recesses 17a is smaller than that of the rows of cavities 14a, the transmission element 17 follows the movement of the pressure element 16a.

Figure 3:
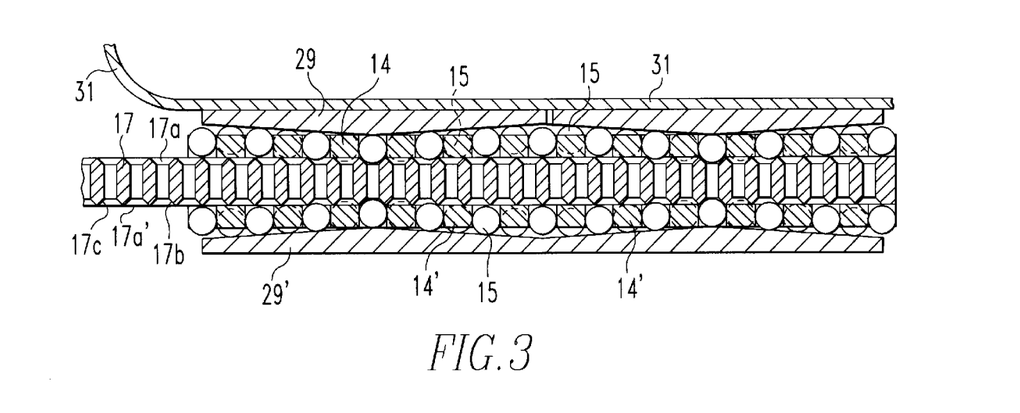
FIG. 3 is an enlargecd sectional view taken in the area of a transfer element for a drive arrangement including different serially arranged transmission structures.

FIGS. 1 and 3 show that the balls 15 are in contact with the pressure element 16a, 29, 29' and with the inclined surfaces 17b of the recesses in the transfer element 17. Generally, more than 40% of the balls are in force-transmitting relation with the transfer element providing for the desired transmission of forces.

The recesses 17a may be conical bores. They provide for appropriate engagement with surface areas on the transfer element 17 and on the pressure element 16a and consequently provide for support with respect to two degrees of freedom that is in two directions normal to each other. The balls 15 engage the inclined surfaces 17b of the bores and support the one component along an area which is parallel to the area in which the recesses 17a are disposed. In this way, an areal transmission structure is provided wherein positioning in two coordinate directions is possible. These may be in Cartesion coordinates, cylinder coordinates, polar coordinates or other coordinate systems. The two directions may form any desirable area such as the surface of an elongated worm gear, a sphere or a plane. It is important however that at least some of the balls are in contact with a conical surface area. In this connection, the cavities may also be in the form of prisms into which a prism-like pressure element projects from one side to force the balls more or less deeply into the recesses if a ball is not momentarily outside of a recess.

Not all the recesses need to be in the form of conical or truncated conical bores. It is possible for example to provide recesses in the form of straight grooves or annular grooves, This has an advantage in that grooves can be made more precisely and at lower expenses than bores. It is therefore necessary to make a compromise between precision and position accuracy.

Figure 4:
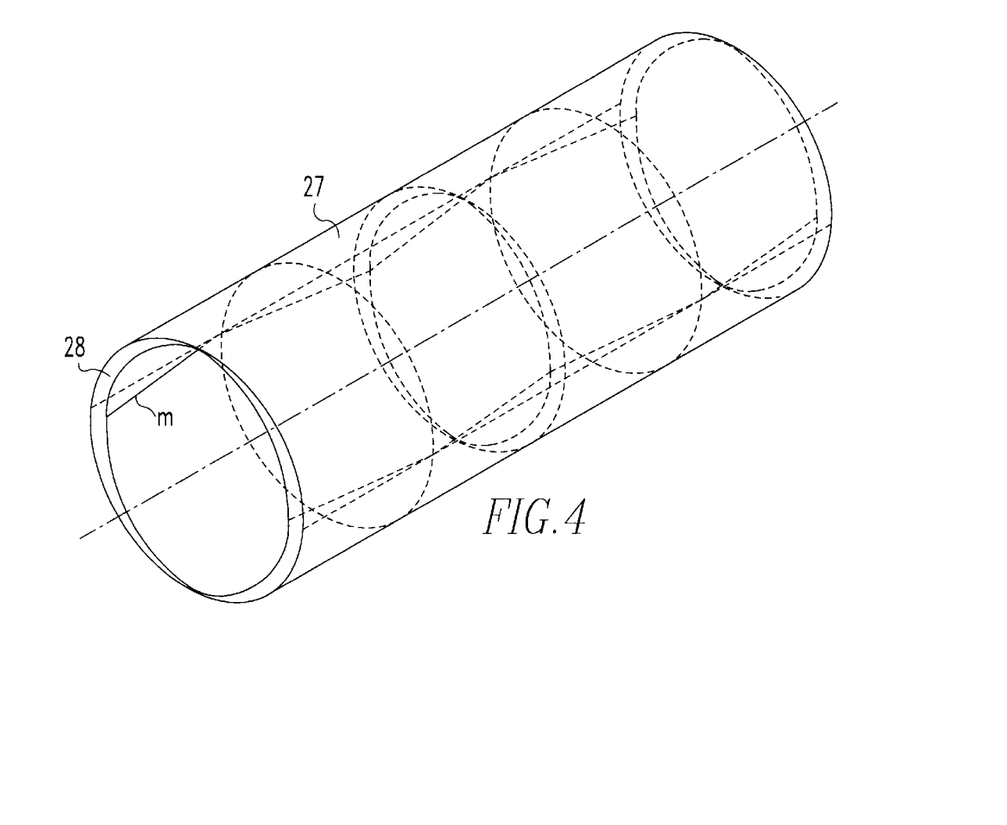
FIG. 4 shows a cylinder-shaped pressure element.

Although FIGS. 1–3 show an arrangement for moving a body by means of a harmonic drive structure laterally the same principle may be used for causing rotational movement. In this case, an arrangement is provided as shown for example in EP 422 263 A1. The balls follow a circular path and are controlled by a cam plate for movement into, and out of, the cavities 14a of a ball cage. The transfer element again includes the respective cone or truncated cone-shaped bores 17a. A cam plate could for example be circular that is, in the form of a circle 28 as shown in FIG. 4 having two ascending and descending cam structures. Of course, such a cam plate ring could be disposed on the inside in a reversed arrangement wherein the balls are pushed outwardly into the cone-shaped recesses of a transmission plate ring extending around the cam plate ring. Also, the cam plate ring could include more than two ascending and descending cam structures. It is pointed out that, in the arrangement as shown in FIG. 1, the pressure element and the cage could also be arranged within the transfer element.

The areal support in connection with the motion transmission rate limits the range of movement as a relatively large movement of the pressure element is needed for a certain movement of the transfer member.

Figure 2A:
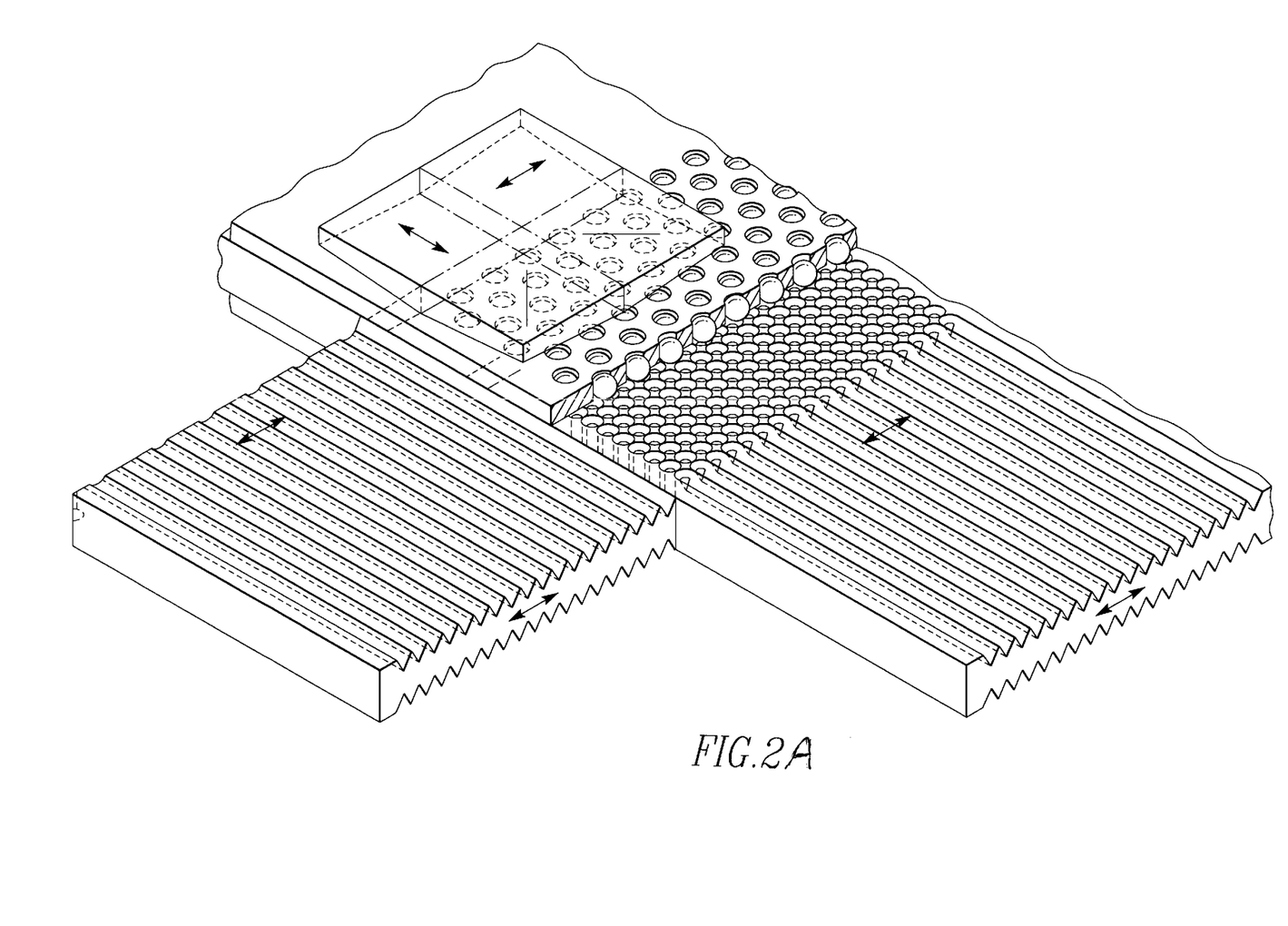
Figure 2B:
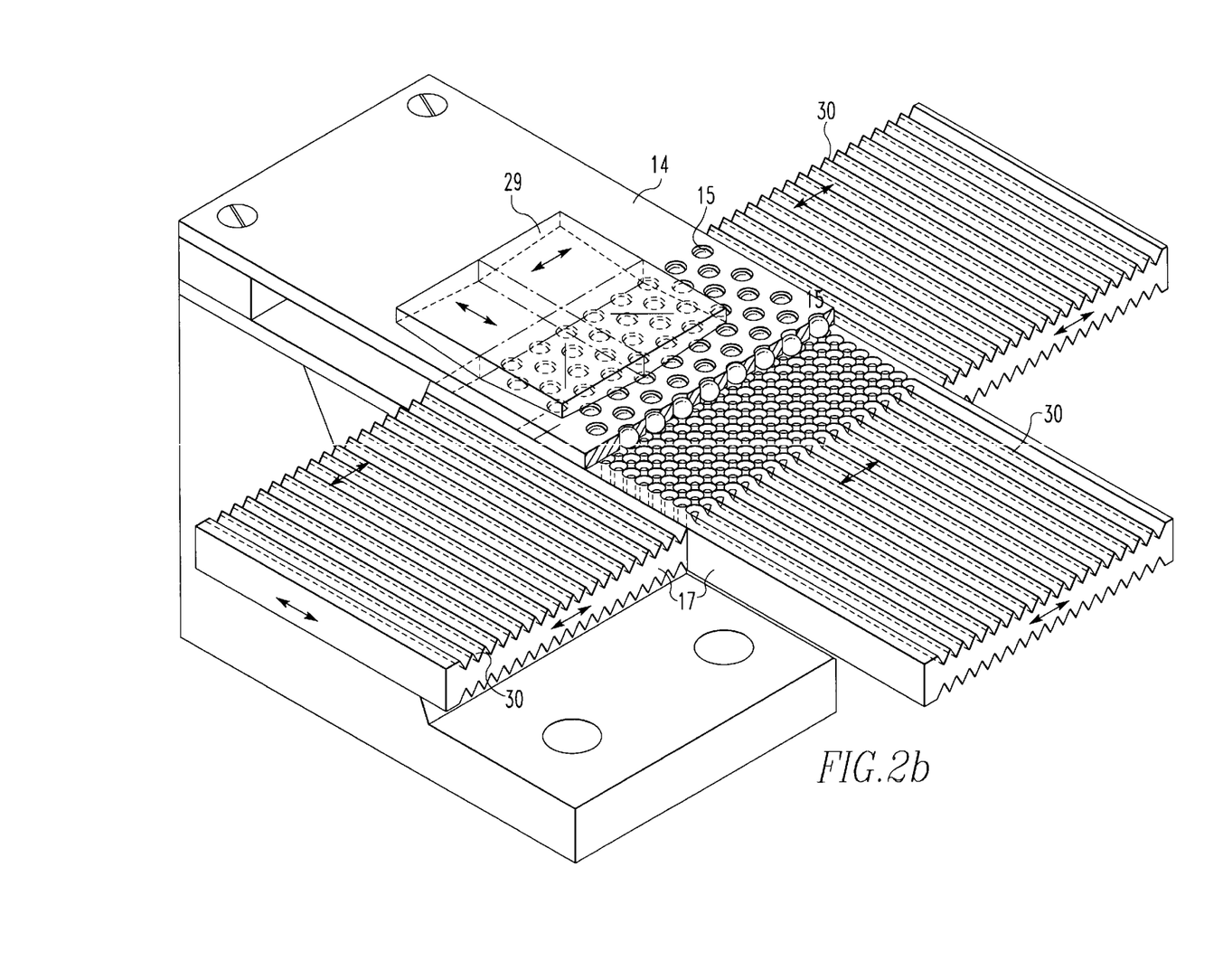

This limitation however can corrected in accordance with FIGS. 2, 2a, 2b in that next to the area with conical bores 17a, there is an area with grooves 30 which extend in the same direction as the rows of cavities and into which the rolling bodies or balls can be transferred for axial translation. However, the grooves may also be arranged sidewardly of the area which includes the bores (FIG. 2a, 2b) Then, movement is possible along the transfer element guided in a direction along the grooves and in the other direction unguided or guided by a stop structure so that the pressure element 29 can be displaced and returned to a position where the balls are again received in the cavities 17a without losing contact with the balls. As it is apparent from FIG. 2b, it does not matter which part of the arrangement remains stationary.

The rolling bodies or balls 15 are in contact with the flanks 17b of the recesses without any play. The engagement surface 16b of the pressure element 16a extends at an angle with respect to the direction of movement of the pressure element 16a which angle is smaller than the self-locking angle of the material of the balls 15 and the pressure element 16a. In this way, the pressure element 16a of FIG. 1 can be moved for example by the operating piston 16c of the cylinder Z but, when the pressure element 16a is in the desired position, the cylinder can be depressurized which may be important if the whole arrangement is to rotate on a robot, for example. Even under these conditions, the arrangemenl does not move out of the desired position because of the self-locking feature. If used in connection with a clamping vise or another tool, the clamping vise can be ejected even without the use of a spring. As additional safety procedure, the arrangement can be held in position by way of a second cone providing an additional engagement force engaging the structure front the outside in a known manner. This does not detrimentally affect the life of the arrangement because the rolling bodies, that is the balls, have a smoothening effect. With such a harmonic drive also the forces can be greatly amplified. High speeds can be converted to low speeds which provides for a high low speed torque or holding torque.

With the diagonal application of the engagement forces for the balls 15, the drive is self adjusting and it is free of wear particularly since the balls 15 soothed any damages to the engagement surfaces. The balls 15 are engaged between the bores or cavities 17a, the pressure element 16, 29 and the recess 14a whereby their positions are given.

The forces that can be transmitted by the drive can be further increased by providing on the transmission element 17 on the side 17c disposed opposite the side which includes the recesses 17a additional recesses 17a' for a second harmonic drive as it is shown in FIGS. 2 and 3. The arrangement of the pressure elements 29 and the ball cage 14 is mirror-reversed with respect to the plane S-S indicated in FIG. 2. There is then another ball cage 14' for the balls 15 disposed at the bottom side of the transmission element 17. For synchronous movement, the upper and lower pressure elements 29, 29' may be coupled whereby higher farces call be transmitted without the need for an additional guide structure for the lower pressure element 29'. In the arrangement, as shown in FIG. 2, the balls 15 are arranged in a rectangular pattern. But they may also be arranged in a triangular pattern, preferably, in the form of an isosceles triangle. This is particularly advantageous for globoidal applications.

Figure 5:
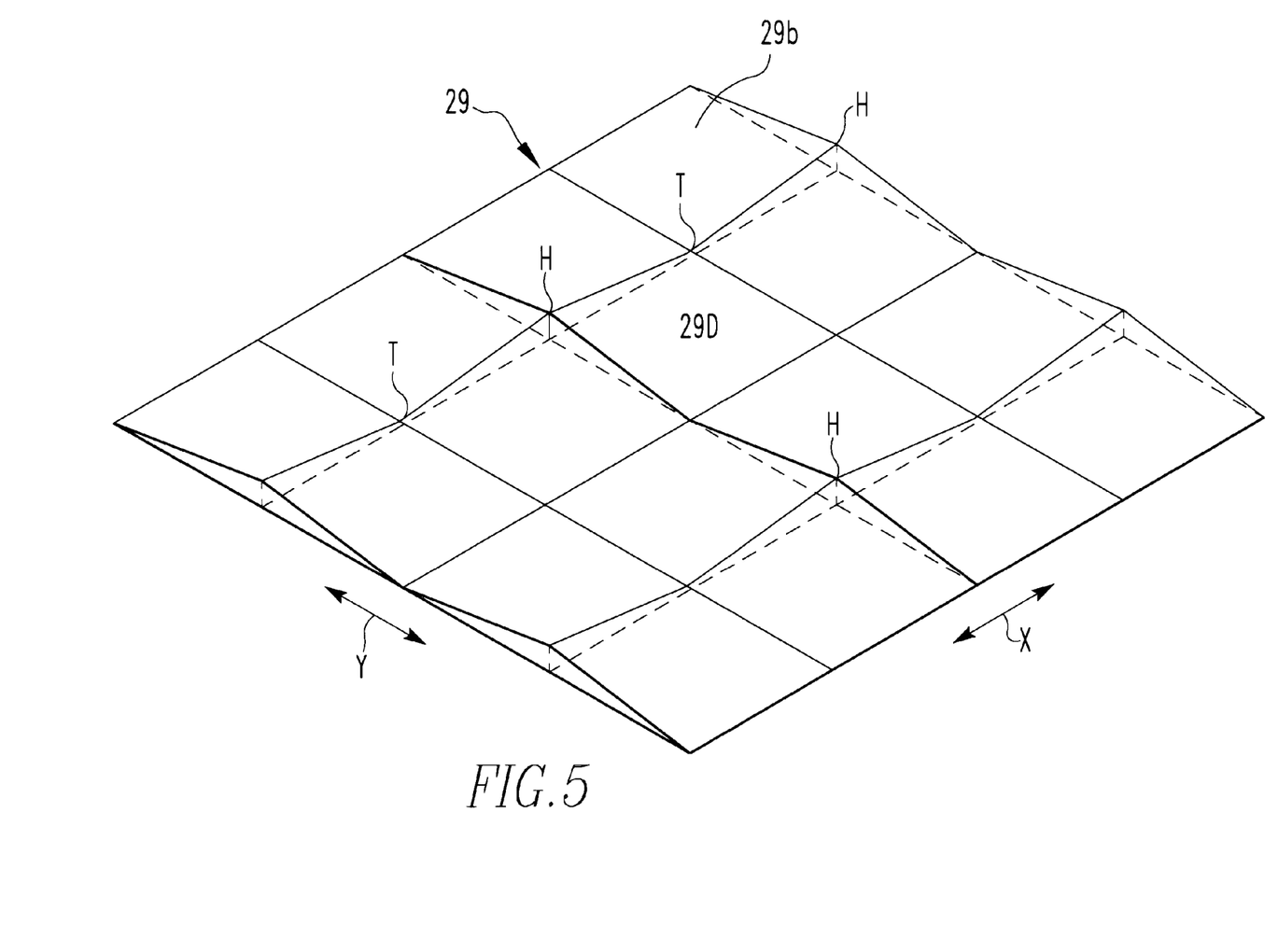
FIG. 5 shows an axial pressure element.

It may also be advantageous to arrange several harmonic drives of the type as shown in FIG. 1 in series in the direction of movement of the transfer element as it is shown in FIG. 3. The balls 15 may at the same time form a bearing supporting one of the components 10, 11 on the other. FIG. 3 shows also an arrangement with a continuous actuation capability wherein several pressure elements 29 are mounted on an endless chain or band 31 revolving around guide rollers providing for endless engagement of the balls and, consequently, a continuous advancement of the transfer clement 17. FIGS. 4 and 5 show the structure of the pressure element 29. In FIG. 5, the pressure element is planar and corresponds to a development of the cylindrical pressure or operating element 27 of FIG. 4. In FIG. 4, the generatrices extend alternately inwardly and outwardly to provide for the cams which actuate the balls 15 in the recesses 14a upon movement of the operating element 27. In the arrangement of FIG. 4, the operating element 27 is a cylinder which is closed and therefore protects the drive from contamination. In the flat arrangement of FIG. 5, the pressure element 29 includes high points H and low points T between which the surface becomes lower and higher in both the x and the y directions. In order to make the pressure application of the pressure element on the balls independent of the direction, the pressure element may have cone-like cam surfaces so that the pressure element is rotatable on the balls 15. This facilitates the relocation of the pressure element into other systems for example by means of a robot. Basically, movements can be affected not only in the directions of the coordinate axes but also transverse or diagonally thereto.

Particularly when used in connection with industrial robots or work stations, wherein pivotal or rotational movements are required it is important that the drive is compact. For this reason, the pressure element 16a in FIG. 1 is part of an operating cylinder Z. The pressure element which, in the embodiment shown in FIG. 1, is cylindrical extends around the cylindrical transfer element 17 and is arranged at the inside of an annular piston structure 16 operable in both directions. The operating cylinder 2 includes an inwardly extending flange 18 which separates the two cylinder chambers 21, 22 from each other. In order to move the pressure element, the annular piston structure 16 includes two outwardly extending radial flanges 16c which can be subjected to pressurized fluid at least at one of their sides. If the pressure element 16a as shown in FIG. 1 is to be moved upwardly, fluid under pressure, for example pressurized air is admitted to the cylinder chamber 22 by way of pressurized fluid supply line 23. For downward movement of the pressure element pressurized fluid is admitted to the cylinder chamber 21 by way of pressurized fluid supply line 24. To increase the force generated by the piston 16, additional cylinder chambers may be provided in series, for example, pressurized fluid may also be admitted to the area of the piston 16 below the lower flange 16c.

Obviously, the arrangement as described herein can be modified in various ways and adapted to various conditions within the scope of the following claims.

What is claimed is:

1. A harmonic drive arrangement for the displacement of one component relative to another component, comprising a ball cage connected to one of said components, said ball cage having cavities arranged in a predetermined pattern of rows disposed at a given distance from one another, balls movably disposed in said cavities, a transfer element connected to the other of said components and being arranged adjacent said ball cage, said transfer element having conical recesses also arranged in a predetermined pattern of rows corresponding to that of said ball cage, with said rows of recesses being disposed at a distance from one another different from the distance between the rows of said cavities in said ball cage, and a pressure element movably supported on said ball cage opposite said transfer element and having inclined rolling surfaces engaging said balls in said ball cage so as to hold said balls in engagement with said transfer element and inclined walls defined by said conical recesses and, depending on the position of said transfer element relative to said ball cage, force said balls more or less deeply into said recesses for moving said transfer element relative to said cage when said pressure element is moved along said ball cage.

2. A drive arrangement according to claim 1, wherein, adjacent said transfer element including said conical recesses, there is a member with grooves which extend in the same direction as, or transverse to, the rows of cavities and into which said balls can be transferred for movement of said ball cage along said grooves.

3. A drive arrangement according to claim 1, wherein said balls engage the inclined rolling surfaces of said pressure element in a play-free manner.

4. A drive arrangement according to claim 1, wherein said inclined rolling surfaces on said pressure element have an angle with respect to the direction of movement of said pressure element which angle is smaller than a self-locking angle of the arrangement considering the material of which the balls and the pressure element consist.

5. A drive arrangement according to claim 1, wherein said components are cylindrical and rotatably supported one within the other and said pressure element is a cylinder having curved ascending and descending cam surfaces.

6. A drive arrangement according to claim 1, wherein said transfer element has conical recesses disposed on opposing sides thereof, and ball cages with balls and respective pressure members are disposed at said opposing sides of said transfer element for increasing a force transmission capability of the drive.

7. A drive arrangement according to claim 1, wherein said pressure element is formed integrally with a piston of an operating cylinder for moving said pressure element along said ball cage for pressing said balls into said recesses.

8. A drive arrangement according to claim 1, wherein said transfer element is cylindrical and said pressure element is a cylinder disposed around the cylindrical transfer element and including an annular piston disposed in an operating cylinder for moving said pressure element.

9. A drive arrangement according to claim 8, wherein said annular piston includes two radial flanges disposed in a cylinder with cylinder chambers to which pressurized fluid can be admitted to subject said flanges to pressurized fluid from at least one side thereof.

* * * * *